180; # United States Patent Office 3,035,294
Patented May 22, 1962

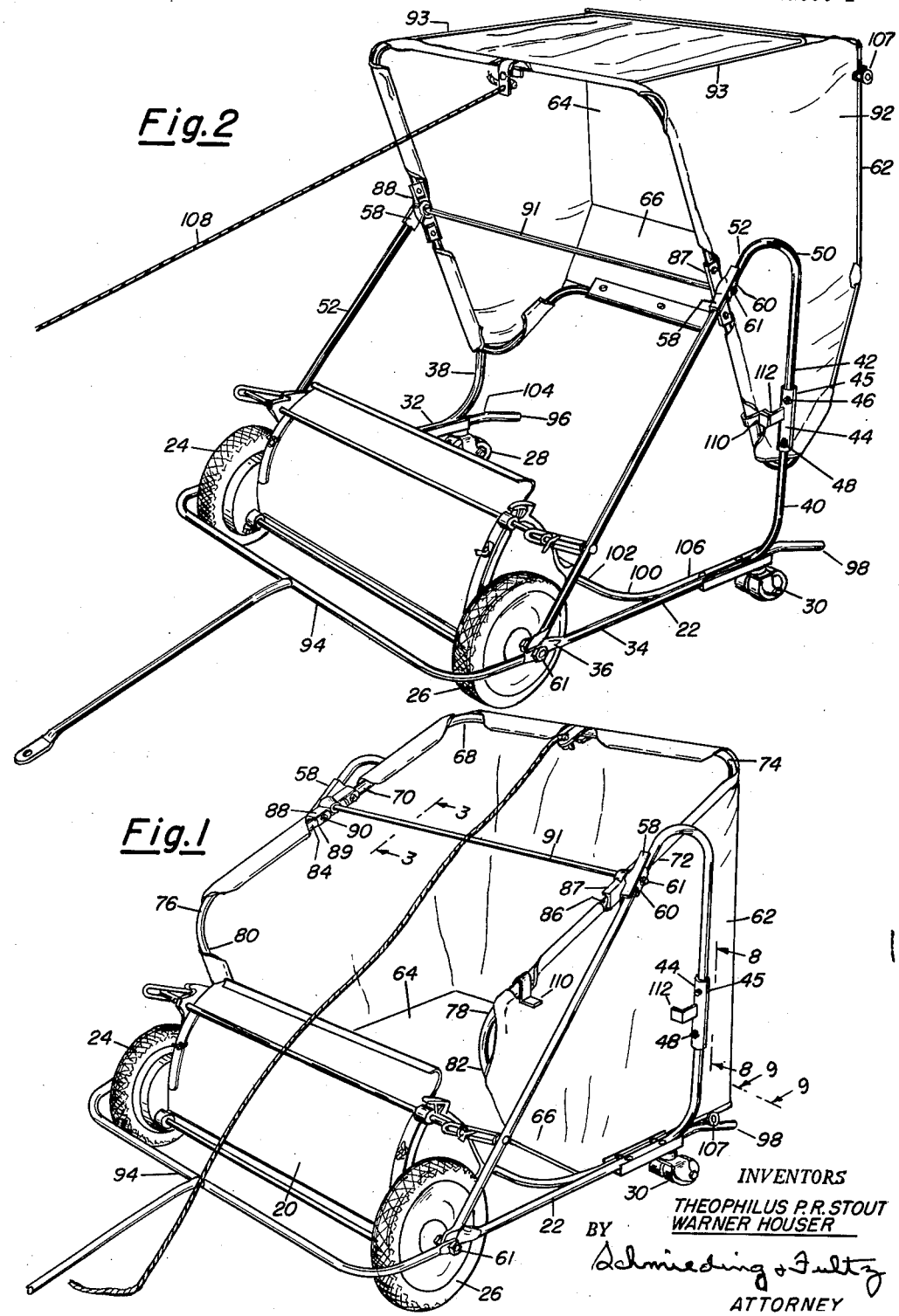

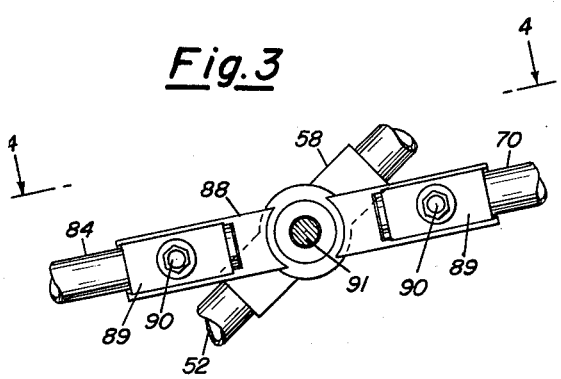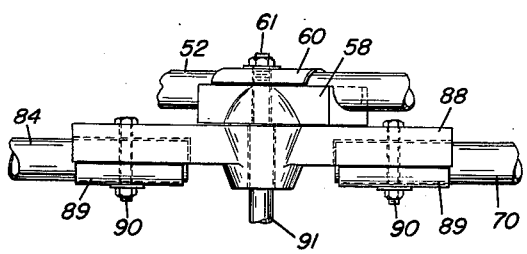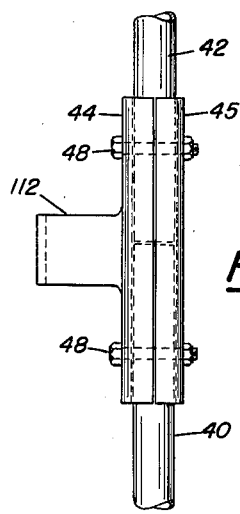

3,035,294
SWEEPER WITH HAND ACTUATED REAR
DUMPING DEBRIS RECEPTACLE
Theophilus P. R. Stout, North Hampton, and Warner Houser, Springfield, Ohio, assignors to Parker Sweeper Company, Springfield, Ohio, a corporation of Ohio
Filed Aug. 17, 1959, Ser. No. 834,313
4 Claims. (Cl. 15—79)

The present invention relates to a machine, such as a lawn mower, or a sweeper such as a lawn sweeper, which machine also includes a debris receptacle which catches and retains the grass being cut and/or the debris being lifted by the brush of the sweeper. The present invention is illustrated, purely for disclosure purpose, as a lawn sweeper which is used primarily for collecting leaves, twigs and other debris usually found on a lawn.

In practicing the invention, there is provided a cart including a frame which is supported on front and rear wheels. This cart carries a machine head, preferably at the front end thereof. This machine head can be a lawn mower or a sweeper. The work element in the head can be a cutter in the form of a reel rotating on a horizontal axis, or blades rotating on a vertical axis, but is herein disclosed as a brush which rotates on a horizontal axis, such machine being more clearly shown in Letters Patent to Edwin D. Parker, No. 2,654,106, issued on October 6, 1953. The brush may be driven by an electric motor or internal combustion engine, or may be driven by the wheels of the cart as disclosed in said Letters Patent.

A debris receptacle is pivotally carried by the cart on an axis disposed at right angles to the general direction of movement of the machine on its wheels, it being pivotally mounted so that it can be inverted sufficiently to dump the debris therefrom.

The axis about which the debris receptacle can be oscillated lies intermediate the center of gravity of the receptacle and the machine head, and, in one embodiment, stop means is provided for limiting the inherent tendency of movement of the receptacle about its axis.

Further objects and advantages will be apparent from the following description, reference being had to the accompanying drawings, wherein a preferred embodiment of the invention is illustrated.

In the drawings:

FIG. 1 is a perspective view of the machine, herein shown as a lawn sweeper, the debris receptacle being in the position in which it is used to collect leaves, twigs and other debris;

FIG. 2 is a perspective view similar to FIG. 1 but showing the debris receptacle moved to its debris dumping position;

FIG. 3 is a fragmentary view taken along line 3—3 of FIG. 1, but on a larger scale;

FIG. 4 is a view looking in the direction of arrows 4—4 of FIG. 3;

FIG. 5 is a perspective view of one of the clamps;

FIG. 6 is a perspective view of a block by which parts of the frame are connected with one another;

FIG. 7 is a perspective view of one of the bearing blocks for the debris receptacle;

FIG. 8 is a fragmentary view of the frame tubes and the clamps for connecting the tubes; and FIG. 9 is a fragmentary view of the lower part of the sweeper looking in the direction of arrows 9—9 of FIG. 1 but on a larger scale.

Referring more in detail to the drawings, the machine 20 includes a main frame 22 which is U-shaped when viewed from the front. This frame is suitably supported at the front by wheels 24 and 26 and by casters at the rear, one being shown at 28 and the other at 30. The frame 22 includes two rearwardly extending tubes 32 and 34. The front ends of these tubes are flattened as at 36 to receive the axle of the wheels 24 and 26. The rear ends of tubes 32 and 34 extend upwardly as at 38 and 40 and are brought into abutting relationship with downwardly extending tubes on either side of the frame, one of which is shown at 42. These tubes are suitably clamped to one another by two concave shaped clamps 44 and 45 bolted to the tubes by bolts 46 and nuts 48. The upper ends of tubes 42 are arcuately shaped as at 50 and then extend downwardly and forwardly as at 52. Each of the tubes 52 carries a concave shaped block 58 and a concave shaped clamp 60 which are held in place by bolts 61, as will appear more clearly hereinafter.

The lower ends of tubes 52 are also flattened like tubes 32 and 34 and drilled to receive the axles of the wheels 24 and 26 respectively. The axles are threaded and the tubes are held in position by nuts 61.

Thus the frame includes two sections, one including the horizontally extending member 34, the rearwardly and upwardly extending member 52, and the upright connecting members 40, 42, and 44, and the other section including like members.

The debris receptacle 62 is disposed between the frame sections and comprises a bottom 64 formed of sheet metal and includes a forwardly and upwardly extending section 66. The top of the debris receptacle 62 includes a tubular U-shaped frame 68 having forwardly extending legs 70 and 72, the rear ends of which are connected with one another by a yoke 74. The receptacle also includes frame members 76 and 78 having downwardly extending portions 80 and 82, respectively, and rearwardly extending portions 84 and 86. The lower ends of the downwardly extending portions 80 and 82 are suitably connected to the bottom extending section 66. Portions 84 and 70 are aligned and likewise portions 86 and 72 are aligned. These portions extend upwardly and rearwardly, and they have their respective ends lying within the concaves of concave shaped bearing blocks 87 and 88 and are fastened to said blocks 87 and 88 by concave shaped block 89 and bolts 90.

The debris receptacle is mounted for oscillating movement on the frame 22 and for this purpose, a rod 91 is provided which forms the axle for supporting the bearing blocks 88 and 89. Bolts 61 are threaded into the opposite ends of shaft or rod 91 to thereby clamp the tubes 52 between blocks 58 and clamps 60.

Axle 91 is disposed tranversely to the direction of movement of the sweeper. The receptacle also includes a canvas 92 forming the sides and rear of the receptacle. If desirable the upper and lower parts of the receptacle 62 can be held in space relation from one another by suitable rods 93 suitably attached to the frame 68 and the bottom 64.

As previously stated, the sweeper may be actuated by a motor or engine (not shown) which in turn also could operate the brush through the wheels 24 and/or 26. As herein shown the sweeper is pulled by any suitable means such as a tractor, and for this purpose there is provided a T-shaped member 94. The rear ends of the tines are drilled to receive the axles of the wheels and they are held in position by the nuts 61.

The center of gravity of the receptacle 62 lies rearwardly of the axle 91 whereby the receptacle inherently tends to be retained and inherently tends to move to the position shown in FIG. 1, in which position the rear of the receptacle rests upon two stops 96 and 98. These stops are formed by the U-shaped frame members 100, the yoke portion 102 of which bridges the tubes 32 and 34, and are connected to said tubes by leg portions 104 and 106. Tubes 32 and 104, and 34 and 106, are connected to one another in any suitable manner. The stops 96 and 98 are part of the legs 104 and 106 respectively, and extend downwardly and are adapted to be engaged by stops 107 disposed on opposite sides of the debris receptacle.

The debris receptacle may be tilted from the position shown in FIG. 1 to its dumping position, shown in FIG. 2, by any suitable means, and is herein shown as a cord 108 which is suitably fastened to the center portion of the yoke 74. When the machine is being pulled by a tractor, the operator of the tractor pulls forwardly on the cord 108 in order to dump the debris out of the receptacle 62. If desirable suitable stop means may be provided for preventing the complete overturning of the debris receptacle, and for this purpose we have shown a stop 110 on the debris receptacle which is arranged to engage a stop 112 on the tube 44. These stops are so disposed so as to prevent the debris receptacle from being rotated beyond the position in which the center of gravity is moved forwardly of the axle 91. In other words, the center of gravity of the debris receptacle is always retained rearwardly of said axle.

From the foregoing it will be seen that we have provided for ready dumping of the debris either when the machine is stationary or while it is being moved forwardly. As soon as the tension of the receptacle cord 108 is released, the debris receptacle will be returned from the position shown in FIG. 2 to that shown in FIG. 1.

While the form of embodiment herein shown and described constitutes a preferred form, it is to be understood that other forms may be adopted falling within the scope of the claims that follow.

We claim:
1. A lawn machine comprising, in combination, a cart including a frame having rearwardly extending frame sections, spaced horizontally from one another, each of said sections including a rearwardly and substantially horizontally extending member, each of said sections including a rearwardly and upwardly extending member, and each of said sections including an upright member connecting the rear ends of the first and second mentioned members, axle means on the front and on the rear of the frame, wheels on the axle means; a machine head carried by the front of the frame between said sections and including a rotatable work element; bearing means adjacent the top and rear of each of second mentioned members of said frame sections and disposed forwardly of the rear wheels, the axes of the bearing means being aligned and disposed transversely of the direction of movement of the cart on the wheels; an open front and open top debris receptacle disposed between said frame sections and including axle means cooperating with the bearing means for pivotally supporting the debris receptacle, the axle means for the debris receptacle lying forwardly of the center of gravity of the receptacle in all positions to which the receptacle can be moved.

2. A lawn machine, comprising in combination, a cart including a frame having rearwardly extending frame sections spaced horizontally from one another, each of said sections including a rearwardly and substantially horizontally extending member, each of said sections including a rearwardly and upwardly extending member, and each of said sections including an upright member connecting the rear ends of the first and second mentioned members, axle means on the front and on the rear of the frame, wheels on the axle means; a machine head carried by the front of the frame between said sections and including a rotatable work element; bearing means adjacent the top and rear of each of second mentioned members of said frame sections and disposed forwardly of the rear wheels, the axes of the bearing means being aligned and disposed transversely of the direction of movement of the cart on the wheels; an open front and open top debris receptacle disposed between said frame sections and including axle means cooperating with the bearing means for pivotally supporting the debris receptacle; and stop means for limiting rotatable movement in either direction, of the receptacle about the bearing means, the axle means for the debris receptacle lying forwardly of the center of gravity of the receptacle in all positions to which the receptacle can be moved.

3. A lawn sweeper, comprising in combination, a cart including a frame having spaced, upright side sections, axle means at the front of the frame, wheels on said axle means, axle means at the rear of the frame, wheels on the second mentioned axle means; a machine head carried by the front of the frame between the side sections and including a rotatable work element; bearing means adjacent the top and rear of each section of the frame sections and disposed forwardly of the rear wheels, the axes of said bearing means being aligned and disposed transversely of the direction of movement of the cart on the wheels; an open front and open top debris receptacle disposed between the frame sections and including axle means cooperating with the bearing means for pivotally supporting the debris receptacle, the axle means for the debris receptacle lying forwardly of the center of gravity of the receptacle in all positions to which the receptacle can be moved.

4. A lawn sweeper, comprising in combination, a cart including a frame having spaced, upright side sections, axle means at the front of the frame, wheels on said axle means, axle means at the rear of the frame, wheels on the second mentioned axle means; a machine head carried by the front of the frame between the side sections and including a rotatable work element; bearing means adjacent the top and rear of each section of the frame sections and disposed forwardly of the rear wheels, the axes of said bearing means being aligned and disposed transversely of the direction of movement of the cart on the wheels; an open front and open top debris receptacle disposed between the frame sections and including axle means cooperating with the bearing means for pivotally supporting the debris receptacle, the axle means for the debris receptacle lying forwardly of the center of gravity of the receptacle in all positions to which the receptacle can be moved; and stop means for limiting rotatable movement in either direction, of the receptacle about the bearing means.

References Cited in the file of this patent
UNITED STATES PATENTS

| | | |
|---|---|---|
| 283,415 | Passmore | Aug. 21, 1883 |
| 439,806 | Miller | Nov. 4, 1890 |
| 586,513 | Warfel | July 13, 1897 |
| 734,555 | Hoadley | July 28, 1903 |
| 875,056 | Fergesen | Dec. 31, 1907 |
| 1,507,317 | Laberge | Sept. 2, 1924 |

FOREIGN PATENTS

| | | |
|---|---|---|
| 629 | Great Britain | Feb. 20, 1875 |